Oct. 25, 1949.  C. FRONDEL  2,486,146

PRESSURE RESPONSIVE TRANSDUCER

Filed Oct. 1, 1948

Inventor
Clifford Frondel
by Roberts Cushman & Grover
Att'ys

Patented Oct. 25, 1949

2,486,146

UNITED STATES PATENT OFFICE 2,486,146

PRESSURE RESPONSIVE TRANSDUCER

Clifford Frondel, Cambridge, Mass., assignor to Cambridge Thermionic Corporation, Cambridge, Mass., a corporation of Massachusetts Application October 1, 1948, Serial No. 52,374

7 Claims. (Cl. 177—386)

This invention relates to gauges and more particularly to gauges of the type using the piezoelectric effect, exhibited when certain properly cut crystals are stressed hydrostatically, as an indication of the magnitude of the external stresses resulting from high amplitude, short duration pressure transients in a surrounding fluid.

Objects of this invention are to provide a piezoelectric gauge which accurately measures the amplitude and magnitude of short period pressure waves in a fluid, which indicates the shape of a transient pressure wave, which has an electrical response substantially linear with respect to variations in pressure, which is simple in operation, which is small in size and light in weight, which is rugged and requires very little maintenance, which is inexpensive to construct, and which advances the art of gauge manufacture generally.

In a broad aspect the invention contemplates a gauge for measuring a pressure transient comprising a plurality of piezoelectric elements connected in parallel and held by a supporting member. The supporting member also may connect the sides of the elements having one electrical polarity with one of two relatively stiff electrical leads which are insulated from each other. The elements and supporting member are surrounded and protected by an inner core of wax-like material over which a thin layer of electrical conducting material is placed. The thin conducting layer links the respective element sides having the opposite polarity with the second conductor. An outer sheath of insulating material covers the conducting layer so that the layer is electrically and mechanically protected.

In another aspect one of the two leads is a tubular metal base, the other lead being positioned within the tubular base and maintained in coaxial relationship therewith by means of insulation so that the two leads comprise the outer and inner conductors of a coaxial cable connecting the piezoelectric elements to the indicating or recording instruments used in connection therewith.

Another feature of the invention is the use in pairs of a plurality of tourmaline discs or other crystals responsive piezoelectrically to hydrostatic pressure as the elements of the gauge. Two or more pairs of such discs are arranged coaxially so that the adjacent ends thereof are of the same polarity when stressed. The supporting member comprises a connecting strip with a circular piece having a diameter substantially that of the piezoelectric discs located at each of the respective ends thereof. The strip is folded at its midpoint so that each circular piece is positioned between the adjacent ends of the abutting discs of a respective pair.

In a specific aspect the gauge contemplated by the invention comprises a tubular metal base to the wall of which is fastened a flange of a sleeve by means of a fused metal joint made, for example, by soldering or brazing. The sleeve is fused to a glass bead having a wire passing axially therethrough to connect with a conductor maintained in coaxial relationship within the metal base by means of insulation. Two pairs of piezoelectric tourmaline discs are coaxially arranged so that adjacent ends of the respective discs are of the same electrical polarity. A supporting member for example of silver, including a connecting strip with a circular piece located at each of the respective ends thereof is folded at its midpoint so that each circular piece is positioned between layers of silver plated on the abutting ends of a respective pair of discs. An inner core of wax-like material surrounds the discs and the supporting member. The core is covered with a layer of silver paint which links the base with the layers of silver plated on the opposite ends of the respective pairs of discs. An outer protecting sheath of insulating material such as wax or molded neoprene is used to cover the silver paint.

These and other objects, aspects and features of the invention will be apparent from the following description of a specific embodiment referring to a drawing wherein Fig. 1 is a longitudinal cross-sectional view of an embodiment of the invention;

Figure 1:
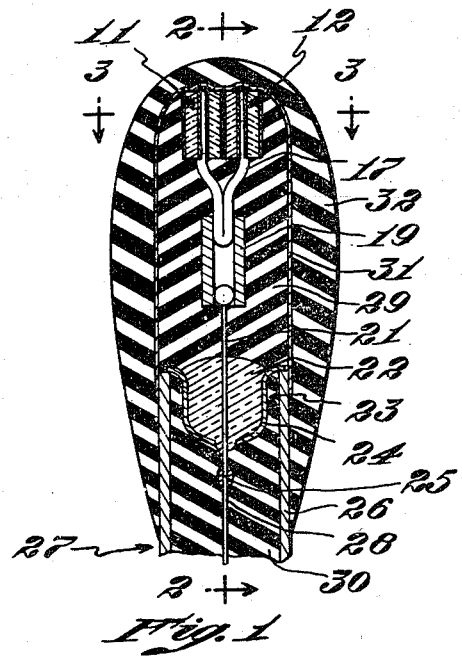

In the particular embodiment of the invention chosen for the purpose of illustration, the gauge (Fig. 1) comprises a plurality of piezoelectric elements such as the two pairs 11 and 12 of discs, the pair 11 including the discs 11a and 11b, and the pair 12 the discs 12a and 12b. The respective discs are made by cutting a tourmaline crystal so that the ends of the resulting disc are perpendicular to the polar or C axis of the crystal when cut in this manner the ends of the disc will develop charges of the opposite polarity whenever the crystal is subjected to a hydrostatic pressure. Although it is possible to predict the electrical polarity of the charges upon the respective disc ends by a study of the crystalline structure it is usually more expedient to empirically determine the polarity by a simple electrical test with an electroscope.

Tourmaline crystals are preferred because of their superior mechanical strength and chemical stability as well as relative high linear electrical response to variations in pressure; but other materials, for example, lithium sulfate monohydrate ($Li_2SO_4.H_2O$) which exhibit electrical charges of opposite polarity on different sides thereof whenever such materials are subjected to a hydrostatic pressure, may be used for the discs 11a, 11b, 12a and 12b.

Figure 4:
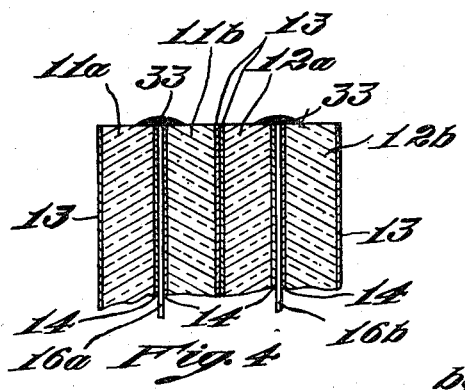
Fig. 4 is a fragmentary cross-sectional view of the piezoelectric discs illustrating the silver layers on the respective ends thereof.

As is shown in Fig. 4 silver layers 13 and 14 are plated on the respective ends of the tourmaline disc 11a, 11b, 12a and 12b to collect the electrical charges produced as described above. When, for example, the disc 11a is subjected to an external stress, the positive charges resulting from the piezoelectric effect appearing upon the end of the disc adjacent the layer 13 are collected by such layer. The negative charges appearing upon the opposite end of the disc 11a are collected by the layer 14 in an analogous manner.

Such layers 13 and 14 can be deposited by ceramic plating. The silver in the layers 13 and 14 is carried in colloidal suspension by an organic binder which is painted upon the ends of the disc 11a. The binder is then volatilized by baking the disc in an oven thereby to leave a thin tightly adhering film of pure silver. Silver may also be deposited by the decomposition of silver bearing salts or by electroplating over a graphite layer which is first coated upon the ends of the disc. The silver layers, ceramic plated in a similar manner upon the respective sides of the discs 11b, 11a and 11c, collect the charges appearing thereupon when these discs are stressed.

The discs 11a and 11b are arranged coaxially with their respective negative layers 14 adjacent the opposite sides of a circular piece 16a of a silver supporting member 17. A similar circular piece 15b at the opposite end of the number 17 is inserted between the respective negative silver layers 14 of the coaxially arranged pair 12 which includes discs 12a and 12b.

Figure 5:
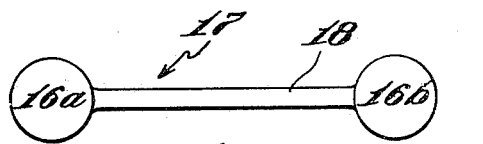
Figs. 5 and 6 are the plan and elevation views respectively of the supporting member before bending.
Figure 6:
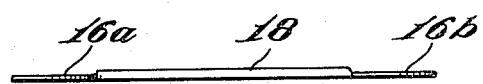
Figure 3:
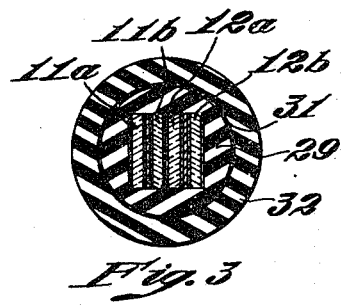
Fig. 3 is a cross-sectional view on line 3—3 of Fig. 1.
Figure 2:
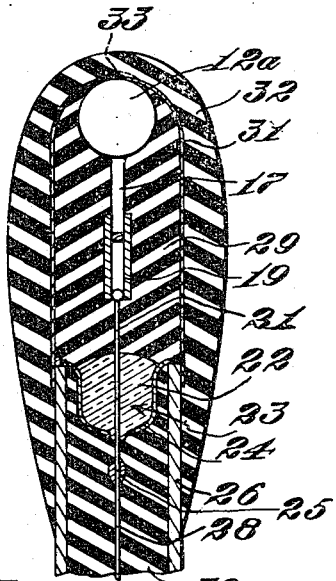
Fig. 2 is a cross-sectional view on line 2—2 of Fig. 1.

As is shown in Figs. 5 and 6, the supporting member 17 comprises a connecting silver strip 18 both ends of which are flattened to form the respective circular pieces 16a and 16b which have a diameter substantially that of the tourmaline discs. As is shown in Fig. 1, the connecting strip 18 is folded double at its midpoint and the two branches bent generally in the shape of a wye so that the two pairs 11 and 12 of tourmaline discs are in axial alignment with two of the positive silver layers 13 of the discs 11b and 12a in abutment.

The folded end of the connecting strip 17 projects into one end of a metal tube 19 wherein it is maintained by a soldered connection. The opposite end of the tube 19 is soldered to one end of a lead such as the conductor 21 which passes centrically through a glass bead 22 of a connector 23. The other end of the lead 21 is soldered to a conductor 28 as at 25. Fused to the outside of the glass bead 22 is a flanged metal sleeve 24. A fused metal joint is made by soldering or brazing of the sleeve flange to the end of a tubular lead 26 which acts as a base for the gauge assembly. The lead 26 is also the outer conductor of a coaxial cable 27 which connects the gauge with a recording or indicating instrument (not shown). The inner conductor 28 of the coaxial cable 27 is maintained in coaxial relationship with the tubular conductor 27 by means of an insulator 30.

To provide insulation and mechanical rigidity, the discs pairs 11 and 12 and the supporting member 17 are surrounded by an inner core 29 of wax-like material such as paraffin. This material is applied by dipping the assembly repeatedly in a molten bath until the outer diameter of the core 29 is approximately that of the tubular conductor 26. The surface of the core 29 is covered by a thin conducting layer 31, for example, of silver paint. The layer 31 extends over the outside of the tubular conductor 26 so that good electrical contact is made therebetween. The conducting layer 31 also makes contact with the negatively charged silver layer 13 of the discs 11a and 12b and the abutting silver layers of the discs 11b and 12a.

To prevent the layer 31 of silver paint 31 from short circuiting the discs, a dab 33 (Fig. 4) of latex is placed on the top of the abutting ends of each of the respective pairs 11 and 12 of discs so that the layer 31 does not come in contact with the negatively charged layers 14.

An outer sheath 32 protects the silver paint layer 31. The sheath 32 may be formed by dipping the gauge assembly in a molten bath waxlike material or by premolding a neoprene sheath which is slipped over the assembly after silver painting.

The gauge may be used to measure pressure changes in either liquids or gases. One extensive use is the measurement of the wave shapes of under water explosions. When making such measurements the gauge is suspended at the end of the coaxial cable 27 and lowered to the desired depth. The opposite end of the cable 27 is connected to the input terminals of an amplifier driving a recording oscillograph. Any changes in pressure in the water surrounding the gauge results in a change in potential across the discs which is impressed upon the amplifier input terminals by the cable 27.

The gauge is similarly used to measure pressure transients in air or other gases resulting from explosions. As the electrical output is a function of the area of the ends of the discs, this area is made considerably greater in gauges for use in a gas so that the output is great enough to be measured accurately.

It should be understood that present disclosure is for the purpose of illustration only and that this invention includes all modifications and equivalents which fall within the scope of the appended claims.

I claim:

1. A piezoelectric gauge for measuring pressure transients in a fluid comprising a plurality of piezoelectric elements connected in parallel, two relatively stiff electrical leads insulated from each other, a supporting member connecting the respective element sides of one electrical polarity to one of said leads, an inner core of wax-like material surrounding said elements and said supporting member, a thin layer of electrical conducting material covering said core and linking the respective element sides of the other polarity with the other of said leads, and an out projecting sheath of insulating material covering said conducting layer.

2. A piezoelectric gauge for measuring pressure transients in a fluid comprising a tubular metal base, a conductor positioned within said base, an insulator maintaining said base and conductor in coaxial relationship, a plurality of piezoelectric elements electrically connected in parallel, a supporting member connecting the respective element sides having one electrical polarity to said conductor, an inner core of wax-like material surrounding said elements and said supporting member, a thin layer of electrical conducting material covering said core and linking said base with the respective element sides having the opposite polarity, and an outer protecting sheath of insulating material covering said conducting layer.

3. A piezoelectric gauge for measuring pressure transients in a fluid comprising a tubular metal base, a conductor positioned within said base, an insulator maintaining said base and conductor in coaxial relationship, a connector including a glass bead having a lead passing axially therethrough to connect with said conductor and a metal sleeve fused to the outside thereof, a fused metal joint fastening said sleeve to the wall of the base, a plurality of piezoelectric elements electrically connected in parallel, a supporting member connecting the respective element sides having one electrical polarity to said lead, an inner core of wax-like material surrounding said elements and said supporting member, a thin layer of electrical conducting material covering said core and linking said base with the respective element sides having the opposite polarity, and an outer protecting sheath of insulating material covering said conducting layer.

4. A piezoelectric gauge for measuring pressure transients in a fluid comprising a tubular metal base, a conductor positioned within said base, an insulator maintaining said base and conductor in coaxial relationship, a plurality of piezoelectric discs electrically connected in parallel, a layer of silver plated on each of the respective ends of said discs, a supporting member connecting the respective disc ends having one electrical polarity to said conductor, an inner core of wax-like material surrounding said elements and said supporting member, a thin layer of electrical conducting material covering said core and linking said base with the disc ends having the opposite polarity, and an outer protecting sheath of insulating material covering said conducting layer.

5. A piezoelectric gauge for measuring pressure transients in a fluid comprising a tubular metal base, a conductor positioned within said base, an insulator maintaining said base and conductor in coaxial relationship, two pair of piezoelectric discs axially arranged so that adjacent ends of the respective discs are of the same polarity, a supporting member including a connecting strip and a circular piece located at each of the respective ends thereof, said strip being folded at its midpoint so that each circular piece is positioned between the adjacent ends of the discs of a respective pair, an inner core of wax-like material surrounding said discs and said supporting member, a thin layer of electrical conducting material covering said core and linking said base with the respective disc ends having the opposite polarity, and an outer protecting sheath of insulating material covering said conducting layer.

6. A piezoelectric gauge for measuring pressure transients in a fluid comprising a tubular metal base, a connector including a glass bead having a lead passing axially therethrough to connect with said conductor and a metal sleeve fused to the outside thereof, a fused metal joint fastening said sleeve to the wall of the base, two pair of piezoelectric discs axially arranged so that adjacent ends of the respective discs are of the same polarity, a layer of silver plated on each of the respective ends of said discs, a supporting member connected to said lead said member including a connecting strip and a circular piece located at each of the respective ends thereof, said strip being folded at its midpoint so that each circular piece is positioned between the adjacent ends of the discs of a respective pair, an inner core of wax-like material surrounding said elements and said supporting member, a layer of metal paint covering said core and linking said base with the opposite disc ends, and an outer protecting sheath of insulating material covering said silver paint.

7. A piezoelectric gauge for measuring pressure transients in a fluid comprising a tubular metal base, a connector including a glass bead having a lead passing axially therethrough to connect with said conductor and a metal sleeve fused to the outside thereof, a fused metal joint fastening said sleeve to the wall of the base, two pair of tourmaline discs axially arranged so that adjacent ends of the respective discs are of the same polarity, a layer of silver plated on each of the respective ends of said discs, a supporting member connected to said lead, said member including a connecting strip and a circular piece located at each of the respective ends thereof, said strip being folded at its midpoint so that each circular piece is positioned between the adjacent ends of the discs of a respective pair, an inner core of wax-like material surrounding said elements and said supporting member, a layer of metal paint covering said core and linking said base with the opposite disc ends, and an outer protecting sheath of insulating material covering said silver paint.

CLIFFORD FRONDEL.

REFERENCES CITED

The following references are of record in the file of this patent:

UNITED STATES PATENTS

| Number | Name | Date |
|---|---|---|
| 2,138,036 | Kunze | Nov. 29, 1938 |
| 2,402,531 | Christian | June 25, 1946 |
| 2,447,333 | Hayes | Aug. 17, 1948 |